United States Patent
Zhang et al.

(10) Patent No.: US 11,600,082 B1
(45) Date of Patent: *Mar. 7, 2023

(54) IMAGE ANALYSIS TECHNOLOGIES FOR ASSESSING SAFETY OF VEHICLE OPERATION

(71) Applicant: State Farm Mutual Automobile Insurance Company, Bloomington, IL (US)

(72) Inventors: Dingchao Zhang, Normal, IL (US); Yuntao Li, Champaign, IL (US); Jeffrey S. Myers, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/011,811

(22) Filed: Sep. 3, 2020

Related U.S. Application Data

(63) Continuation of application No. 15/914,794, filed on Mar. 7, 2018, now Pat. No. 10,776,644.

(51) Int. Cl.
| | |
|---|---|
| *G06V 20/59* | (2022.01) |
| *G08B 5/36* | (2006.01) |
| *G08B 3/10* | (2006.01) |
| *B60Q 9/00* | (2006.01) |
| *G06V 40/20* | (2022.01) |
| *G06V 40/16* | (2022.01) |

(52) U.S. Cl.
CPC .............. *G06V 20/597* (2022.01); *B60Q 9/00* (2013.01); *G06V 40/165* (2022.01); *G06V 40/20* (2022.01); *G08B 3/10* (2013.01); *G08B 5/36* (2013.01)

(58) Field of Classification Search
CPC ........... G06K 9/00845; G06K 9/00248; G06K 9/00335; B60Q 9/00; G08B 3/10; G08B 5/36
See application file for complete search history.

(56) References Cited

U.S. PATENT DOCUMENTS

| | | | | |
|---|---|---|---|---|
| 5,008,946 | A * | 4/1991 | Ando .................... | G06V 40/168 382/104 |
| 6,927,694 | B1 * | 8/2005 | Smith ................... | B60K 28/066 340/576 |

(Continued)

OTHER PUBLICATIONS

Office Action dated Feb. 18, 2021 for U.S. Appl. No. 15/969,501 "Technologies for Using Image Analysis to Facilitate Adjustments of Vehicle Components", Li, 18 pages.

(Continued)

*Primary Examiner* — Fayyaz Alam
(74) *Attorney, Agent, or Firm* — Lee & Hayes, P.C.

(57) ABSTRACT

Systems and methods for using image analysis techniques to assess unsafe driving conditions by a vehicle operator are discloses. According to aspects, a computing device may access and analyze image data depicting the vehicle operator. In analyzing the image, the computing device may measure certain visible metrics as depicted in the image data and compare the metrics to corresponding threshold values, and may accordingly determine whether the vehicle operator is exhibiting an unsafe driving condition. The computing device may generate and present alerts that indicate any determined unsafe driving condition.

20 Claims, 12 Drawing Sheets

(56) References Cited

U.S. PATENT DOCUMENTS

| | | | |
|---|---|---|---|
| 9,311,271 B2 | 4/2016 | Wright | |
| 9,505,494 B1 | 11/2016 | Marlow et al. | |
| 9,633,487 B2 | 4/2017 | Wright | |
| 10,192,369 B2 | 1/2019 | Wright | |
| 10,198,879 B2 | 2/2019 | Wright | |
| 10,275,670 B1 | 4/2019 | Li et al. | |
| 2002/0116106 A1 | 8/2002 | Breed et al. | |
| 2004/0234103 A1* | 11/2004 | Steffein | G06T 7/0012 |
| | | | 382/104 |
| 2005/0156725 A1 | 7/2005 | Muhammad | |
| 2008/0219501 A1* | 9/2008 | Matsumoto | G06T 7/251 |
| | | | 382/103 |
| 2012/0148117 A1 | 6/2012 | Chang | |
| 2012/0148159 A1* | 6/2012 | Kaneda | A61B 3/0058 |
| | | | 382/190 |
| 2013/0238167 A1 | 9/2013 | Stanfield et al. | |
| 2013/0311001 A1 | 11/2013 | Hampiholi | |
| 2014/0093133 A1 | 4/2014 | Frank et al. | |
| 2014/0200737 A1 | 7/2014 | Lortz et al. | |
| 2015/0235484 A1 | 8/2015 | Kraeling et al. | |
| 2015/0363986 A1 | 12/2015 | Hoyos et al. | |
| 2016/0262682 A1* | 9/2016 | Omi | A61B 5/7455 |
| 2016/0300242 A1 | 10/2016 | Truong et al. | |
| 2017/0043783 A1 | 2/2017 | Shaw | |
| 2017/0066406 A1 | 3/2017 | Ricci | |
| 2017/0161576 A1* | 6/2017 | Banno | G08B 21/02 |
| 2017/0247000 A1 | 8/2017 | Ricci | |
| 2018/0065582 A1 | 3/2018 | Miller et al. | |
| 2018/0211541 A1 | 7/2018 | Rakah et al. | |
| 2018/0370363 A1 | 12/2018 | Vinogradov | |
| 2019/0283579 A1* | 9/2019 | Munaoka | G08G 1/166 |
| 2019/0300002 A1* | 10/2019 | Fung | G07C 5/02 |
| 2022/0144193 A1 | 5/2022 | Li et al. | |

OTHER PUBLICATIONS

Office Action for U.S. Appl. No. 17/011,754, dated Oct. 29, 2021, Li, "Image Analysis Technologies for Identifying Abnormal Vehicle Conditions ", 18 Pages.

Final Office Action dated Mar. 6, 2020 for U.S. Appl. No. 16/273,642 "Image Analysis Technologies for Identifying Abnormal Vehicle Conditions", Li, 13 pages.

Non-Final Office Action dated Oct. 18, 2019 for U.S. Appl. No. 15/969,501 "Technologies for Using Image Analysis to Facilitate Adjustments of Vehicle Components" Li, 23 pages.

Non-Final Office Action from U.S. Appl. No. 15/914,794, Zhang et al., dated Nov. 15, 2019, 19 pages.

Non-Final Office Action dated Nov. 20, 2019 for U.S. Appl. No. 16/273,642 "Image Analysis Technologies for Identifying Abnormal Vehicle Conditions", Li, 15 pages.

Office Action from U.S. Appl. No. 15/914,794, Zhang et al., dated Feb. 20, 2020, 24 pages.

Final Office Action dated Mar. 4, 2020 for U.S. Appl. No. 15/969,501 "Technologies for Using Image Analysis to Facilitate Adjustments of Vehicle Components" Li, 25 pages.

Non Final Office Action dated Jun. 26, 2020 for U.S. Appl. No. 15/969,501 "Technologies for Using Image Analysis to Facilitate Adjustments of Vehicle Components" Li, 31 pages.

Non-Final Office Action dated Jun. 27, 2018 for U.S. Appl. No. 15/914,745 "Image Analysis Technologies for Identifying Abnormal Vehicle Conditions", Li, 16 pages.

Office Action for U.S. Appl. No. 15/969,501, dated May 24, 2021, Li, "Technologies for Using Image Analysis to Facilitate Adjustments of Vehicle Components", 19 pages.

* cited by examiner

500

Driving Report

Basic Summary

Driver:
Yuntao

Trip Time:
from 2017-06-27-13:06-27-13-08

Phone Calls:
2 times (detected)

Distracted Driving:
4 times (detected)

Drowsy Driving:
1 times (detected)

FIG. 5A

IMAGE ANALYSIS TECHNOLOGIES FOR ASSESSING SAFETY OF VEHICLE OPERATION

PRIORITY

This application is a continuation of, and claims priority to, U.S. patent application Ser. No. 15/914,794, filed on Mar. 7, 2018, and entitled "IMAGE ANALYSIS TECHNOLOGIES FOR ASSESSING SAFETY OF VEHICLE OPERATION", the entire disclosures of which are expressly incorporated by reference herein for all purposes.

FIELD OF THE DISCLOSURE

The present disclosure is directed to image analysis technologies associated with assessing the safety of vehicle operation. In particular, the present disclosure is directed to systems and methods for using image analysis techniques to detect unsafe driving conditions and appropriately notifying individuals.

BACKGROUND

Individuals frequently operate or otherwise travel in vehicles, where the environments and conditions of the vehicle operation may be varied. Generally, the amount of technologies within vehicles and available to operators has increased, where some of the technologies increase the tendency of vehicle operators to become distracted. For example, user interfaces such as display screens offer more features which may distract the vehicle operators while driving the vehicle. As another example, certain vehicles offer semi-autonomous operation in which the vehicles may be at least partially operated autonomously, which may cause vehicle operators to become less focused and/or drowsy.

However, existing vehicle technologies are limited in detecting when a vehicle operator's condition poses a safety risk, such as if the vehicle operator is distracted or drowsy. Even assuming that operator distraction or drowsiness detection is possible, actually alerting a vehicle operator that he/she is distracted or drowsy is ineffective. Accordingly, risks that occur because of operator distraction or drowsiness are not mitigated.

Accordingly, there is an opportunity for techniques to detect situations of vehicle operator distraction or drowsiness, and efficiently and effectively alert the vehicle operator accordingly.

SUMMARY

In an embodiment, a system for assessing driving safety within a vehicle is provided. The system may include at least one image sensor configured to capture image data, a non-transitory memory storing a set of computer-executable instructions, and a processor communicatively coupled to the at least one image sensor and the memory. The processor may be configured to execute the computer-executable instructions to cause the processor to: access the image data from the at least one image sensor, the image data comprising a plurality of image frames depicting an interior of the vehicle, determine, from the plurality of image frames, at least a portion of image frames that depict a face of an operator of the vehicle, analyze at least the portion of image frames to determine a state of the operator of the vehicle that poses an unsafe driving condition, and subsequent to analyzing at least the portion of image frames, cause the unsafe driving condition to be indicated to the operator of the vehicle.

In another embodiment, a computer-implemented method of assessing driving safety within a vehicle is provided. The method may include: accessing image data captured by at least one image sensor, the image data comprising a plurality of image frames depicting an interior of the vehicle; determining, by a computer processor from the plurality of image frames, at least a portion of image frames that depict a face of an operator of the vehicle; analyzing, by the computer processor, at least the portion of image frames to determine a state of the operator of the vehicle that poses an unsafe driving condition; and subsequent to analyzing at least the portion of image frames, causing the unsafe driving condition to be indicated to the operator of the vehicle.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 5A-5D illustrate example interfaces, reports, and/or graphics associated with processing image frames included in image data, in accordance with some embodiments.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present embodiments may relate to, inter alia, image analysis techniques for detecting instances of unsafe vehicle operation conditions, such as vehicle operators being distracted or drowsy. The present embodiments may further relate to effectively and efficiently generating and communicating notifications or alerts of unsafe vehicle operation instances to the vehicle operators.

According to certain aspects, systems and methods may capture image data including a plurality of image frames depicting a portion(s) of a vehicle. The systems and methods may identify those of the image frames that depict a face of a vehicle operator, and may analyze those image frames to determine a condition or state of the vehicle operator. In analyzing the image frames, the systems and methods may determine whether the condition or state represents an unsafe vehicle operation condition.

The systems and methods may further generate an alert or notification in response to detecting an unsafe vehicle operation condition. Additionally, the systems and methods may cause the alert or notification to be presented or indicated to the vehicle operator. For example, a user interface within the vehicle may present the alert or notification, or a speaker or other audio output component may audibly alert the vehicle operator. The systems and methods may further generate driving reports indicating various aspects of vehicle operator performance, for review and analysis by the vehicle operator and/or by other entities.

The systems and methods therefore offer numerous benefits. In particular, the systems and methods effectively determine situations in which a vehicle operator may be creating an unsafe vehicle operation condition, and may automatically generate and communicate notifications in an attempt to alert the vehicle operator. Accordingly, certain risks created by the vehicle operator's condition may be effectively and efficiently mitigated, thus increasing the safety of the vehicle operator, any other passengers within the vehicle, and any surrounding individuals and vehicles. It should be appreciated that additional benefits are envisioned.

Figure 1:
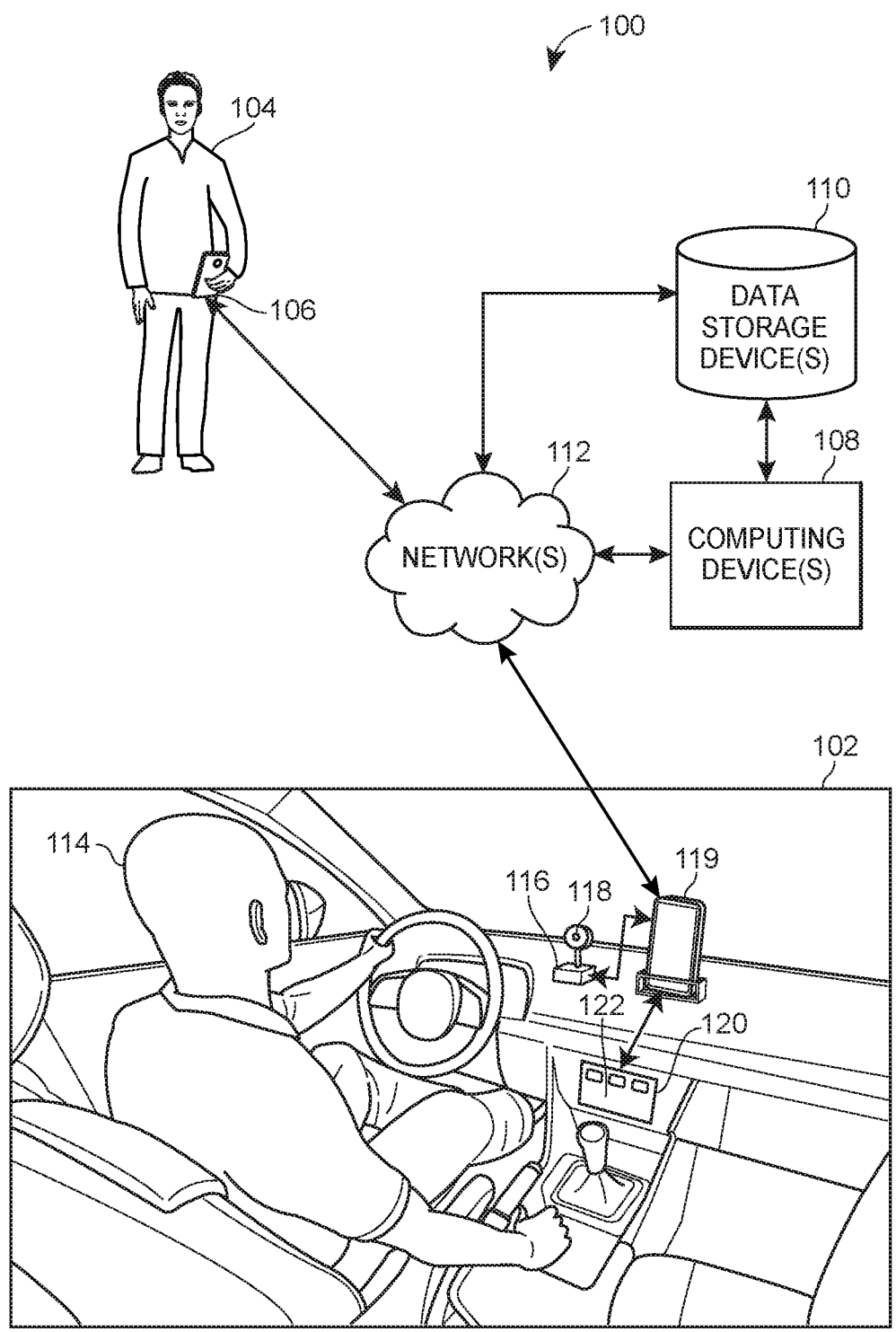
FIG. 1 depicts an overview of components and entities associated with the systems and methods, in accordance with some embodiments.

FIG. 1 illustrates a block diagram of an exemplary system 100 including components and entities configured to facilitate various of the functionalities as discussed herein, in particular determining unsafe vehicle operation conditions and accordingly generating alerts. The system 100 may include both hardware and software components, as well as various data communication channels or links for communicating data between the various hardware and software components, as is described below.

The system 100 may include a vehicle, with an illustration 102 of a portion of the vehicle being shown in FIG. 1 for ease of illustration and explanation. The vehicle may be, for example, an automobile, car, truck, tow truck, snowplow, boat, motorcycle, motorbike, scooter, recreational vehicle, or any other type of vehicle capable of roadway or water travel. According to embodiments, the vehicle may be an autonomous vehicle capable of at least partial (or total) autonomous operation by a computer via the collection and analysis of various sensor data.

As depicted in FIG. 1, an interior of the vehicle may include one or more occupants, such as an operator 114 (and one or more passengers, not shown in FIG. 1); a monitoring device 116, which may include an image capturing component(s) 118 (e.g., a camera); a mobile computing device 119; and an infotainment device (or system) 120. The image capturing component(s) 118 may be configured to capture digital image data (e.g., in the form of one or more image frames) depicting various portions of the interior of the vehicle. For example, the image capturing component(s) 118 may capture image data that depicts a face, a body, and or another portion(s) of the operator 114. Additionally or alternatively, the image capturing component(s) 118 may capture image data that depicts a body (e.g., a face and/or other portion of a body) of a passenger (not shown in FIG. 1) in a front or rear seat of the vehicle. The monitoring device 116 may be located within or external to the vehicle. The monitoring device 116 may transmit, to the mobile computing device 119, any image data captured by the image capturing component(s) 118.

Each of the monitoring device 116 and the mobile computing device 119 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. Further, each of the monitoring device 116 and the mobile computing device 119 may be equipped or configured with a set of sensors, such as a location module (e.g., a GPS chip), an image sensor, an accelerometer, a clock, a gyroscope, a compass, a yaw rate sensor, a tilt sensor, and/or other sensors. In some embodiments or under certain conditions, each of the monitoring device 116 and the mobile computing device 119 may function as thin-client devices that outsource some or most of the processing to one or more of back-end components.

The monitoring device 116 and/or the mobile computing device 119 may belong to or be otherwise associated with the operator 114 (or with another individual located in the vehicle), where the operator 114 may be an owner of the vehicle or otherwise associated with the vehicle. For example, the operator 114 may rent the vehicle for a variable or allotted time period, or the operator 114 may at least partially operate the vehicle as part of a ride share.

The infotainment device 120 may be any suitable device (or system) that may provide suitable and/or desired information and/or entertainment content to one or more occupants, such as the operator 114. In one example, the infotainment device 120 may include a user interface 122 that may include a set of selections via which the operator 114 or other occupant(s) (such other occupants not being shown in FIG. 1) may access navigation information, driving statistics, traffic information, radio controls, and/or any other suitable information and/or entertainment content. The infotainment device 120 may communicate with the monitoring device 116 and/or the mobile computing device 119, such as via one or more wired or wireless connections.

The system 100 may further include a set of back-end components including a computing device(s) 108 and a data storage device(s) 110. Each of the infotainment device 120, the monitoring device 116, and the mobile computing device 119 may communicate with the back-end components via a network(s) 112. The network(s) 112 may include a proprietary network, a secure public internet, a virtual private network, and/or some other type of network, such as dedicated access lines, plain ordinary telephone lines, satellite links, cellular data networks, combinations of these and/or other types of networks. The network(s) 112 may utilize one or more radio frequency communication links to communicatively connect to any of the infotainment device 120, the monitoring device 116, and the mobile computing device 119. Where the network(s) 112 comprises the Internet or other data packet network, data communications may take place over the network(s) 112 via an Internet or other suitable data packet communication protocol. In some arrangements, the network(s) 112 additionally or alternatively includes one or more wired communication links or networks.

The computing device(s) 108 may include one or more servers or computing devices, which may be implemented as a server bank or cloud computing system. The computing device(s) 108 may include one or more computer processors adapted and configured to execute various software applications and components of the system 100, in addition to other software applications. The computing device(s) 108 may interface with the data storage device(s) 110, which may be configured to store data related to the operation of the vehicle and/or the operator 114, the environment and context in which the vehicle is operating, and/or other information. For example, the data storage device(s) 110 may be implemented as a data bank or a cloud data storage system, at least a portion of which may be locally accessed by the computing device(s) 108 using a local access mechanism such as a function call or database access mechanism, and/or at least a portion of which may be remotely accessed by the computing device(s) 108 using a remote access mechanism such as a communication protocol. The computing device(s) 108 may access data stored in the data storage device(s) 108 when executing various functions and tasks associated with the present disclosure.

To communicate with the computing device(s) 108, the infotainment device 120, the monitoring device 116, and/or the mobile computing device 119 may include a communication component(s) that are configured to transmit information to and receive information from the computing device(s) 108. The communication components may include one or more wireless transmitters or transceivers operating at any desired or suitable frequency or frequencies, and according to various communication protocols (e.g., GSM, CDMA, LTE, one or more IEEE 802.11 Standards such as Wi-Fi, WiMAX, BLUETOOTH, etc.).

As illustrated in FIG. 1, a user 104 may have an electronic device 106 capable of communication with other components of the system 100 via the network(s) 112. In particular, the electronic device 106 may communicate with any of the infotainment device 120, the monitoring device 116, the mobile computing device 119, and the computing device(s) 108. According to embodiments, the user 104 may be an individual associated with the vehicle. For example, the user 104 may own the vehicle and/or may be a policyholder of an insurance policy on the vehicle. According to embodiments, the electronic device 106 may be configured to receive and present any notifications, alerts, reports, or the like, as described herein.

Figure 2:
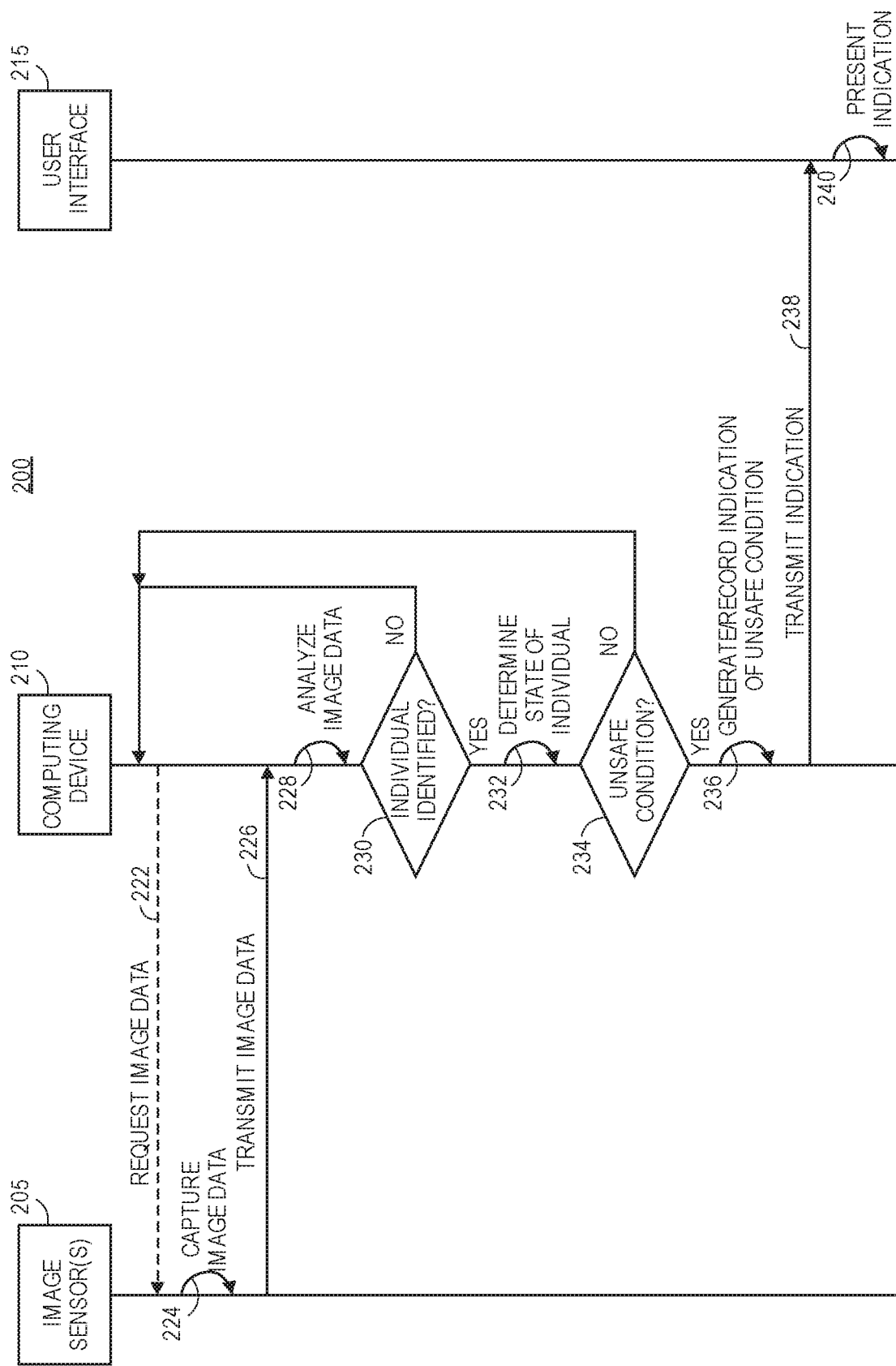
FIG. 2 depicts an example signal diagram associated with using image analysis to assess vehicle operation safety, in accordance with some embodiments.

Generally, any of the computing device(s) 108, infotainment device 120, monitoring device 116, mobile computing device 119, or electronic device 106 may facilitate various of the functionalities as described herein, for example the image analysis, the alert generation and presentation, the report generation, and/or other functionalities. Thus, the computing device(s) 108, infotainment device 120, monitoring device 116, mobile computing device 119, and/or electronic device 106 may communicate amongst each other and transmit any captured or analyzed data (e.g., the image data). FIG. 2 describes additional functionalities associated with various components of the system 100.

FIG. 2 depicts a signal diagram 200 describing certain functionalities associated with the systems and methods. The signal diagram 200 may include one or more image sensors 205, a computing device 210, and a user interface 215. In an implementation, either or both of the image sensor(s) 205 and the user interface 215 may be incorporated in (or separate from) the computing device 210. The image sensor(s) 205 may be disposed within or external to a vehicle capable of operation by an operator, and may be third-party components and/or incorporated within components of the vehicle. The vehicle may transport the operator and optionally one or more passengers. The user interface 215 may be positioned to be within view of the operator of the vehicle, and may be a third-party component or incorporated as part of the vehicle (e.g., as part of an infotainment system of the vehicle). Each of the image sensor(s) 205 and the user interface 215 may be connected to the computing device 210 via one or more wired or wireless connections. The computing device 210 may be local to the vehicle (i.e., may be permanently or temporarily located within the vehicle) or may be remote from the vehicle.

The signal diagram 200 may begin when the computing device 210 optionally requests (222) image data from the image sensor(s) 205. According to embodiments, the computing device 210 may automatically request the image data periodically (e.g., once every ten seconds, once every minute, once every hour), or a user of the computing device 210 (e.g., the operator or a passenger of the vehicle) may cause the computing device 210 to request the image data. Further, the request may include a specified amount of image data (e.g., a number of image frames) and/or a specific time component (e.g., real-time image(s), real-time video, image(s) and/or video recorded five minutes ago).

The image sensor(s) 205 may capture (224) image data, such as according to the request received from the computing device 210. According to embodiments, the image sensor(s) 205 may be positioned so that one or more individuals (e.g., the operator or passenger(s) of the vehicle) are physically within view. In an embodiment, the image sensor(s) 205 may automatically capture the image data continuously or periodically. After capturing the image data, the image sensor(s) 205 may transmit (226) the image data to the computing device 210. In one implementation, the image sensor(s) 205 may automatically send the image data to the computing device 210 in real-time or near real-time as the image sensor(s) 205 captures the image data, and/or in response to a request from the computing device 210. In another implementation, the image sensor(s) 205 may send previously-captured image data to the computing device 210, such as if the image sensor(s) 205 interfaces with some type of memory or storage. It should be appreciated that the image data may depict the operator and/or a passenger(s) of the vehicle.

The computing device 210 may analyze (228) the image data, which may include a plurality of individual image frames. In particular, the computing device 210 may analyze the image data to determine whether an individual(s) is depicted in the image data, and if so, the role of the individual(s) (e.g., operator or passenger). Additionally, if the image data includes a set of image frames, the computing device 201 may identify or determine which of the set of image frames depict the individual(s). Accordingly, the computing device 210 may determine (230) whether an individual (e.g., the operator) is identified. If an individual is not identified ("NO"), proceeding may end, repeat, or proceed to other functionality. In contrast, if an individual is identified ("YES"), processing may proceed to 232.

At 232, the computing device 210 may determine (232) a state or condition of the individual depicted in the image data. In embodiments, the computing device 210 may determine the state or condition by analyzing the image frame(s) that depict the individual. In particular, the computing device 210 may measure various metrics associated with the individual as depicted in the image frame(s), such as a set of head positions (e.g., X and Y head positions), an eye aspect ratio, a mouth aspect ratio, and/or other metrics and measurements. The computing device 210 may also compare the measured metrics to corresponding threshold value(s) to determine whether the measured metrics fall outside of ranges, exceed, or fail to exceed the corresponding threshold value(s), which may indicate whether an unsafe condition exists (e.g., whether the individual is distracted, drowsy, holding a phone, etc.). Additional details describing the metric measurements and threshold comparisons are described with respect to FIGS. 3 and 4A-4H.

If an unsafe condition(s) is not determined ("NO"), processing may end, repeat, or proceed to other functionality. If an unsafe condition(s) is determined ("YES"), the computing device 210 may generate and/or record (236) an indication of the unsafe condition(s). In embodiments, if the computing device 210 records the indication, the computing device 210 may update a record, log, or the like to indicate the unsafe condition(s) as well as other information associated with the unsafe condition(s), such as to whom the unsafe condition(s) is attributable, a detected time, a detected location, and/or other information. Alternatively or additionally, in generating the indication of the unsafe condition(s), the computing device 210 may generate an alert, such as any type of visual and/or auditory alert configured to indicate or convey the unsafe condition(s).

For example, an alert may be in the form of a message indicating the unsafe condition(s) as well as an action to mitigate or eliminate the unsafe condition(s). In another example, the alert may be in the form of an audible tone or signal intended to be heard by the individual. Further, for example, the alert may a series of lights or other types of visual display intended to be seen by the individual.

The computing device 210 may transmit (238) the indication to the user interface 215, such as via any wired or wireless connection. After receiving the indication, the user interface 215 may present (240) the indication. In particular, the user interface 215 may output, display, indicate, and/or the like any content or instructions included in the indication, either visually and/or audibly. Accordingly, the individual may be notified of the unsafe condition and may take appropriate action to mitigate any risks.

Figure 3:
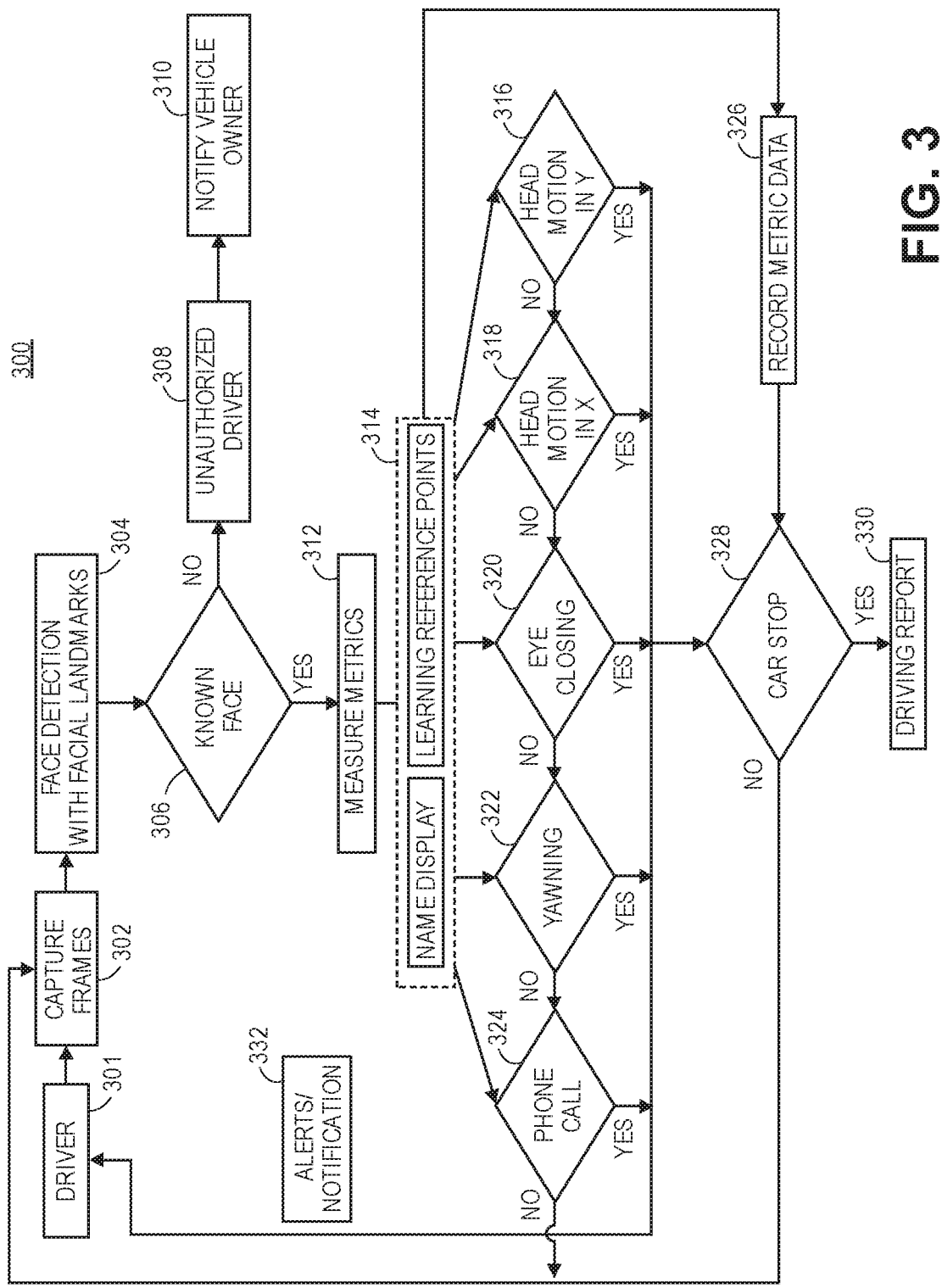
FIG. 3 depicts an example flow diagram associated with using image analysis to assess vehicle operation safety and providing corresponding alerts, in accordance with some embodiments.

FIG. 3 depicts a diagram 300 of various functionalities associated with the systems and methods. The functionalities of the diagram 300 may be facilitated or performed by a combination of components discussed herein, such as the image sensor(s) 205, the computing device 210, and the user interface 215 as discussed with respect to FIG. 2.

At block 302, image frames may be captured and monitored for the detection of a depicted face of an individual. At block 304, facial detection using facial landmarks may be performed. After facial regions are determined, the components may compute a series of metrics describing facial attributes and movement to determine reference values indicating a normal state of the individual (e.g., over the first 10 frames), which may include the individual's standard posture, facial characteristics, and/or the like. According to embodiments, the reference values may have respective lower bounds and upper bounds.

The components may determine (block 306) whether a face depicted in the image frames is known. In embodiments, a face recognition module may be configured to identify known and unknown faces. A database, such as a database implemented in a backend computing device, may store images of known faces, where each face may be encoded into a vector of real numbers as a unique feature associated with each face. Additionally, a machine learning algorithm may compare a similarity between encodings of any two faces. If the similarly between a detected face and a stored (i.e., known) face is below a threshold metric, the detected face may be deemed as unknown or unauthorized and may be indicated as such (e.g., displayed within a red box in a user interface). In an embodiment, the components may capture or record an image of an unknown or unauthorized face and may send the image to a relevant individual (e.g., an owner of the vehicle).

If the face is not known ("NO"), the face may be deemed an unauthorized driver (block 308), and an owner of the vehicle may be notified (block 310). If the face is known ("YES"), the components may measure (block 312) metrics depicted in image frames based on the determined reference values. In particular, the components may analyze subsequent image frames to calculate depicted metrics and compare the calculated metrics to the determined reference values. If any depicted metric(s) is outside the upper and/or lower bound(s) of the corresponding reference value(s), then an abnormal behavior(s) may be deemed to exist. In embodiments, the components may determine an amount of frames (e.g., an amount of consecutive frames) in which the abnormality is depicted.

At block 314, the components may access reference points and facilitate various image analyses using the image data, including head motion in Y direction (block 316), head motion in X direction (block 318), eye closing metrics (block 320), yawing (i.e., mouth position) metrics (block 322), and phone usage (block 324). Generally, in blocks 316-324, the components may detect an unsafe condition exhibited by an individual using various techniques or algorithms.

In an embodiment, the components may measure a degree(s) of head movement in the horizontal and vertical directions. A horizontal threshold (e.g., "HEADX_THRESH") may be a horizontal head movement threshold having an upper bound (e.g., 1.3) and a lower bound (e.g., 0.65), and a vertical threshold (e.g., "READY_THRESH") may be a measured vertical head movement threshold having an upper bound (e.g., 1.3) and a lower bound (e.g., 0.65).

The components may calculate or measure, as depicted in a given image frame, a horizontal head movement value and a vertical head movement value, and may compare the calculated values to the corresponding thresholds. If either of the calculated values is outside of the corresponding thresholds, then the components may determine that the depicted individual has his/her head turned sideways (or up/down) and may deem that the depicted individual is distracted. The components may also measure how many consecutive image frames have calculated values that are outside of the corresponding thresholds, and may generate an alarm accordingly.

The components may additionally or alternatively detect a state of drowsiness exhibited by an individual using various techniques or algorithms. In an embodiment, the components may measure an eye aspect ratio. An eye aspect ratio threshold (e.g., "EYE_AR_THRESHOLD") may be defined as a measured eye aspect ratio divided by a baseline eye aspect ratio. If the eye aspect ratio threshold is below a certain threshold, then the number of image frames in which an individual is depicted closing their eyes may be counted. If the number of image frames exceeds a certain amount (e.g., "EYE_AR_CONSEC_FRAMES"), then an alarm or alert may be generated. As an example, EYE_AR_THRESHOLD may be 0.3 and EYE_AR_CONSEC_FRAMES may be 48. Using the eye aspect ratio to detect drowsiness may be more (or less) sensitive by decreasing (or increasing) EYE_AR_CONSEC_FRAMES.

In an additional or alternative embodiment, the components may measure a mouth aspect ratio to detect a state of drowsiness. A mouth aspect ratio threshold (e.g., "MOUTH_AR_THRESH") may be defined as a measured mouth aspect ratio divided by a baseline eye aspect ratio. If the mouth aspect ratio threshold is below a certain threshold, then the number of image frames in which an individual is depicted with their mouth open may be counted. If the number of image frames exceeds a certain amount (e.g., "MOUTH_AR_CONSEC_FRAMES"), then an alarm or alert may be generated. As an example, MOUTH_AR_THRESHOLD may be 1.3 and MOUTH_AR_CONSEC_FRAMES may be 40. Using the mouth aspect ratio to detect drowsiness may be more (or less) sensitive by decreasing (or increasing) MOUTH_AR_CONSEC_FRAMES.

Additionally or alternatively, the components may determine whether the individual is holding his/her mobile device (e.g., phone) and placing it to his/her ear (i.e., is making a phone call). In particular, in a preprocessing stage, the components may segment out, using a deep learning neural network model from an image frame, a facial region of the individual along with certain facial landmarks. Additionally, the components may measure color and texture information about the skin areas on the face. Further, in a searching and classification stage, the components may use an intelligent sliding window algorithm to assess color, texture, and shape information and determine a potential "hands with mobile device" condition as depicted around the facial region.

If any of the analyses of blocks 316-324 determine an unsafe condition(s) ("YES"), the components may generate (block 332) an alert or notification and communicate the alert or notification to the driver, represented as block 301 (as described with respect to FIG. 2). If the analyses of blocks 316-324 do not determine an unsafe condition(s) ("NO"), then processing may return to block 302, end, or proceed to other functionality. The components may also record (block 326) metric data resulting from the analyses of blocks 316-324. In particular, the metric data may indicate any measured metrics, their association with respective thresholds, occurrence times and locations, and/or other data.

The components may also monitor for the vehicle to stop or cease operation, such as if a trip ends, the vehicle is turned off, or other conditions in which the vehicle is no longer operating. If the vehicle is not stopped ("NO"), then processing may return to block 302, end, or proceed to other functionality. If the vehicle is stopped ("YES"), the components may generate (block 330) a driving report. In embodiments, the driving report may be automatically generated after the vehicle is stopped or otherwise after a trip is completed, and may include the metric data generated in block 326. Further, the driving report may be synced to a designated mobile device for review by an appropriate individual. The driving report may contain a summary of detected driving events such as drowsy driving and distracted driving, time-evolving graphs of tracked statistics, comparisons with driving histories to help operators keep track of their driving patterns, and/or other information. Additionally, the driving report may include a driver score that may be calculated per trip, where the driver score may reflect any events detected during the trip, and may be calculated based on weights of different driving behaviors and combinations of statistics.

FIGS. 4A-4H depict example interfaces associated with processing image frames included in image data, where the image frames depict a face of an operator of a vehicle. The interfaces include a representation of respective image frames as well as parameters associated with the image frames that may be measured during an analysis of the respective image frames. In embodiments, a computing device may be configured to display the interfaces, where the computing device may or may not be the device that analyzes the image frames. It should be appreciated that the interfaces are merely exemplary, and that additional and alternative content is envisioned.

Figure 4A:
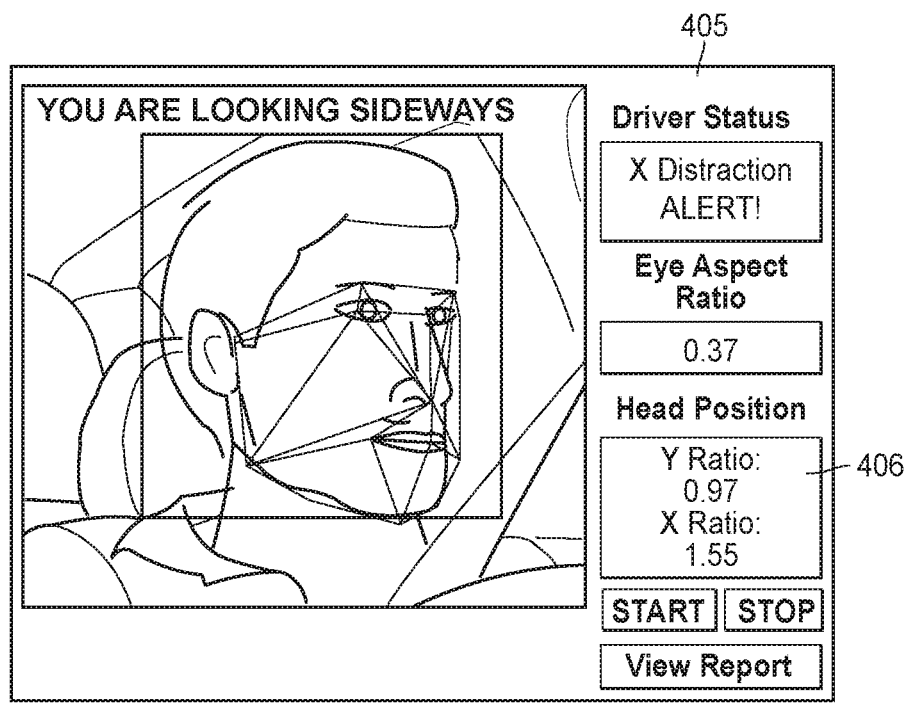
FIGS. 4A-4H illustrate example interfaces associated with processing image frames included in image data, in accordance with some embodiments.

FIG. 4A depicts an interface 405 depicting a face of the operator that is turned to a side. The interface 405 includes head position data 406 that indicates an X ratio (i.e., a horizontal head movement metric) of 1.55 which may fall outside of a corresponding threshold range. Accordingly, the computing device may determine, and the interface 405 may indicate, that the operator is looking sideways.

Figure 4B:
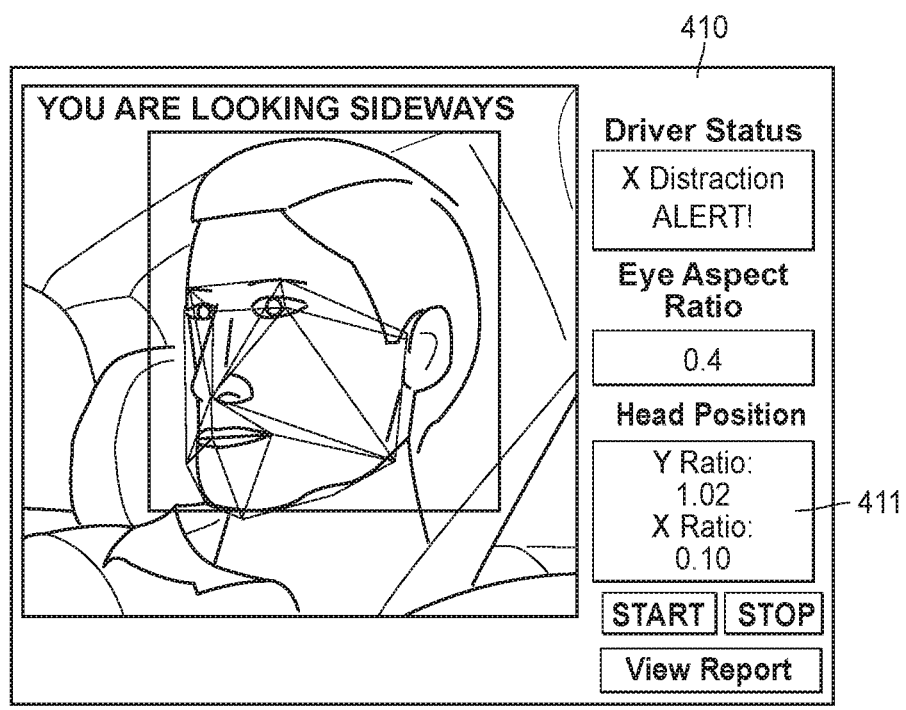

FIG. 4B depicts an interface 410 depicting a face of the operator that is turned to a side. The interface 410 includes head position data 411 that indicates an X ratio (i.e., a horizontal head movement metric) of 0.10 which may fall outside of a corresponding threshold range. Accordingly, the computing device may determine, and the interface 410 may indicate, that the operator is looking sideways.

Figure 4C:
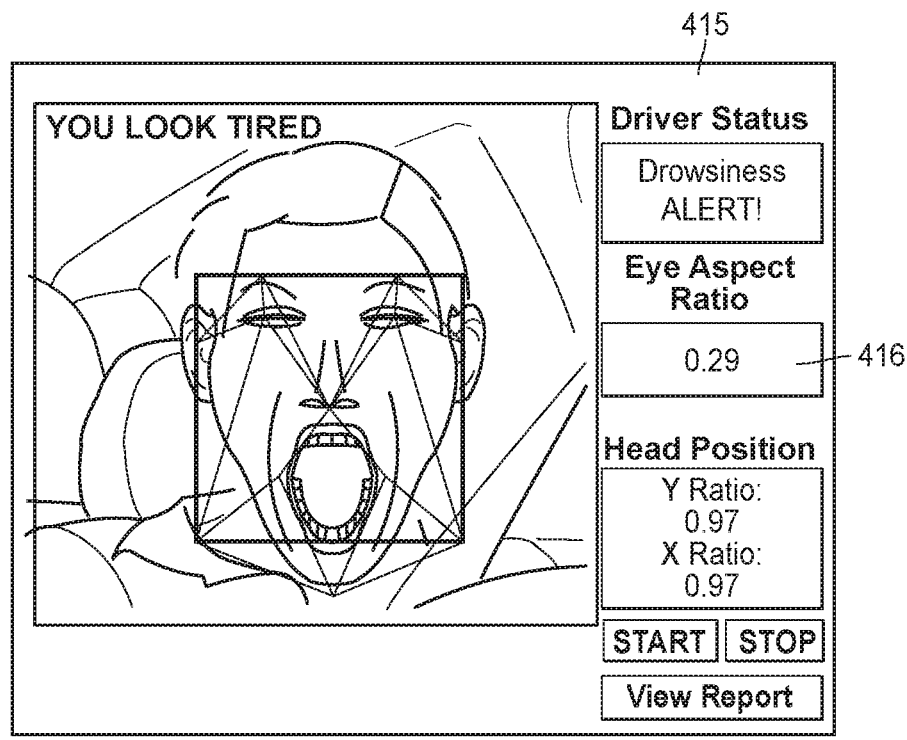

FIG. 4C depicts an interface 415 depicting a face of the operator that is yawing with eyes squinted (i.e., the operator is drowsy). The interface 415 includes eye aspect ratio data 416 that indicates an eye aspect ratio of 0.29 which may fall below a corresponding threshold. Accordingly, the computing device may determine, and the interface 415 may indicate, that the operator appears tired or drowsy. The computing device may alternatively or additionally determine a mouth aspect ratio and assess whether the operator appears tired based on the mouth aspect ratio.

Figure 4D:
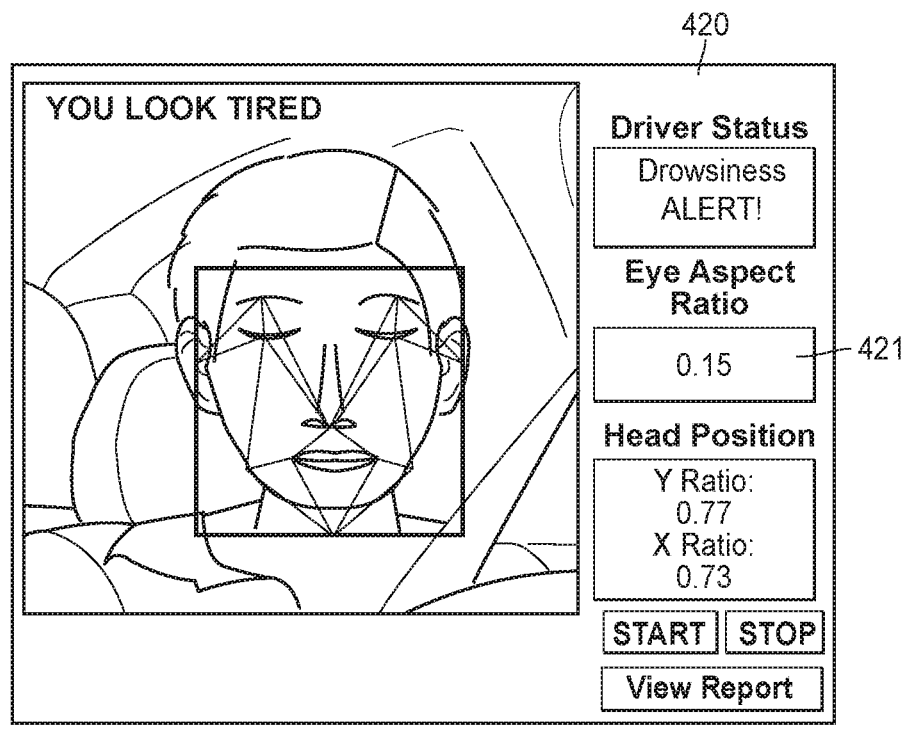

FIG. 4D depicts an interface 420 depicting a face of the operator that is drowsy with eyes closed. The interface 420 includes eye aspect ratio data 421 that indicates an eye aspect ratio of 0.15 which may fall below a corresponding threshold. Accordingly, the computing device may determine, and the interface 420 may indicate, that the operator appears tired. The computing device may alternatively or additionally determine a mouth aspect ratio and assess whether the operator appears tired based on the mouth aspect ratio.

Figure 4E:
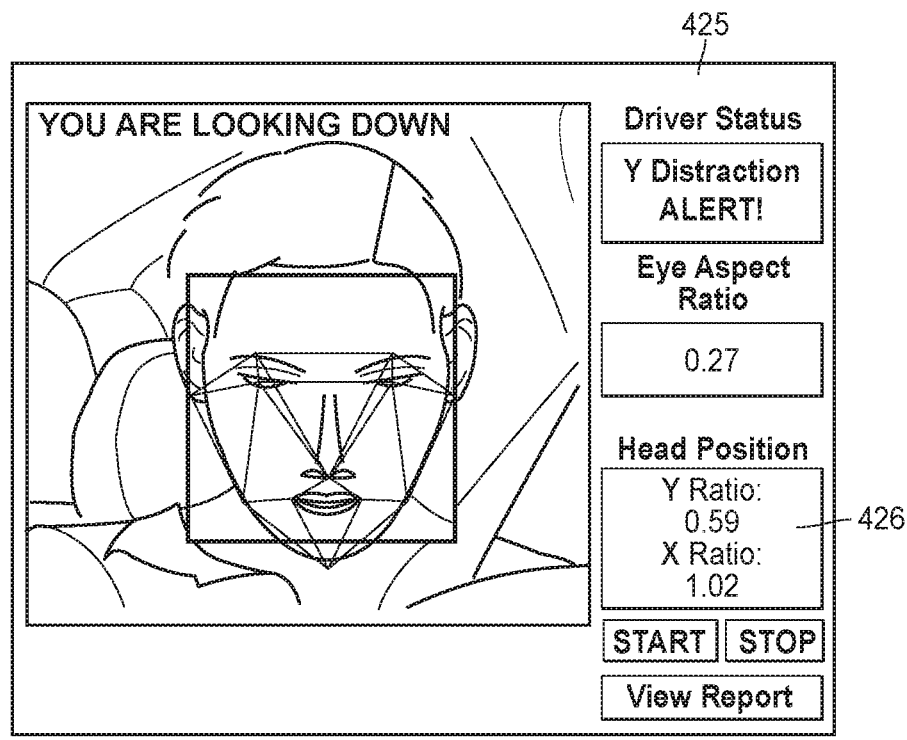

FIG. 4E depicts an interface 425 depicting a face of the operator that is looking down. The interface 425 includes head position data 426 that indicates a Y ratio (i.e., a vertical head movement metric) of 0.59 which may fall outside of a corresponding threshold range. Accordingly, the computing device may determine, and the interface 425 may indicate, that the operator is looking down and is therefore distracted.

Figure 4F:
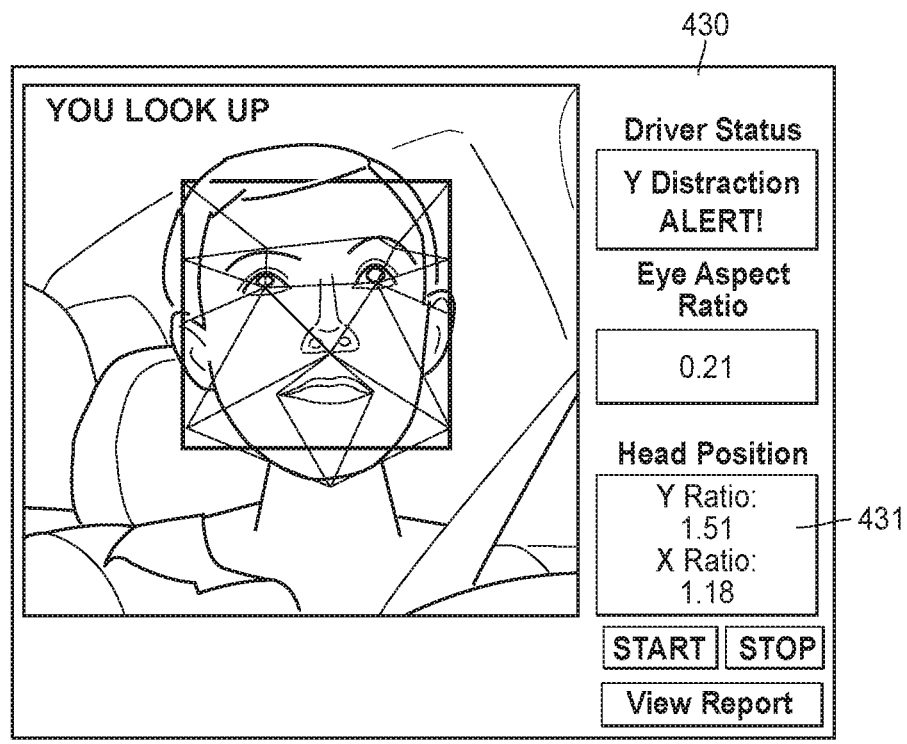

FIG. 4F depicts an interface 430 depicting a face of the operator that is looking up. The interface 430 includes head position data 431 that indicates a Y ratio (i.e., a vertical head movement metric) of 1.51 which may fall outside of a corresponding threshold range. Accordingly, the computing device may determine, and the interface 430 may indicate, that the operator is looking up and is therefore distracted.

Figure 4G:
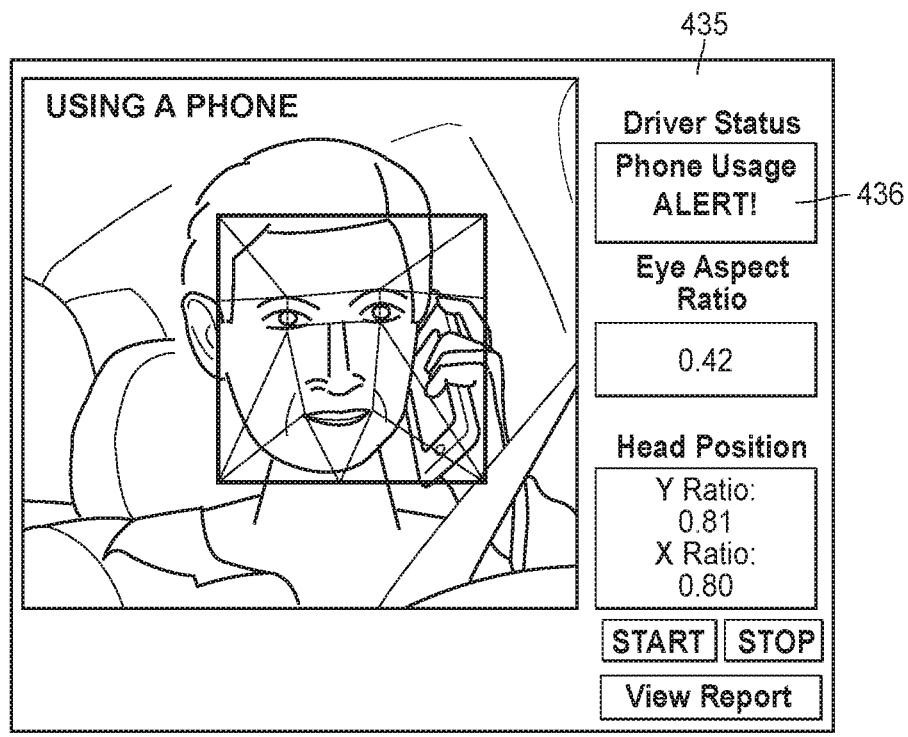

FIG. 4G depicts an interface 435 depicting an operator who is using a phone. The computing device may determine that the hand of the operator is holding the phone and is positioned near a facial region. Accordingly, the computing device may determine, and the interface 435 may indicate, in a window 436, that the operator is using a phone.

Figure 4H:
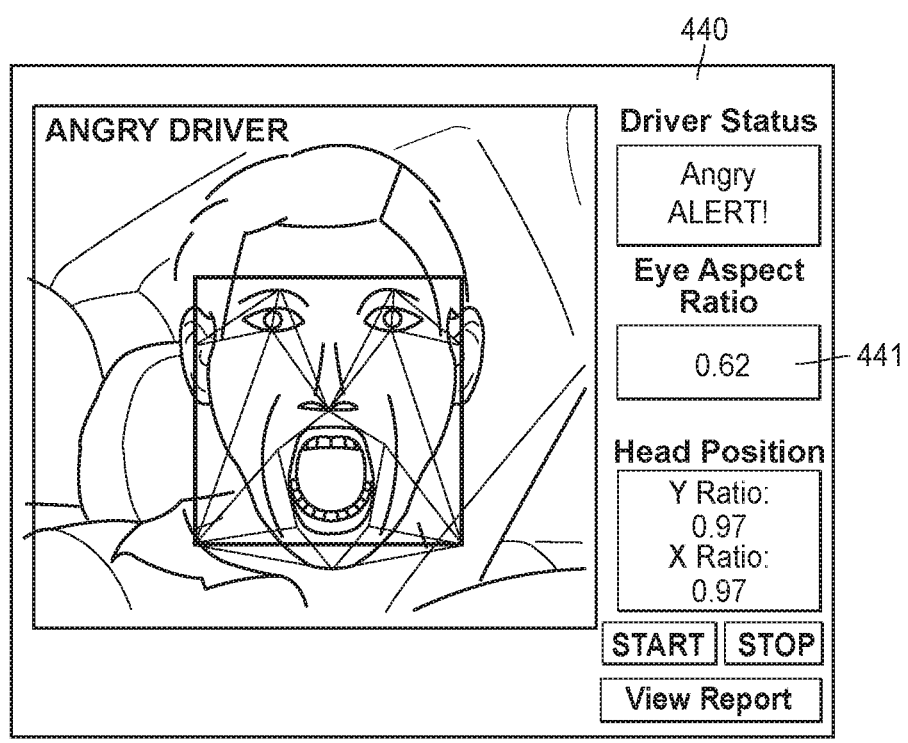

FIG. 4H depicts an interface 440 depicting a face of the operator that is angry. The interface 440 includes eye aspect ratio data 441 that indicates an eye aspect ratio of 0.62 which may exceed a corresponding threshold. Accordingly, the computing device may determine, and the interface 440 may indicate, that the operator appears angry. The computing device may alternatively or additionally determine a mouth aspect ratio and assess whether the operator appears angry based on the mouth aspect ratio.

FIGS. 5A-5D depict example interfaces, reports, and/or graphics associated with processing image frames included in image data. The interfaces, reports, and/or graphics may include various information and data, and it should be appreciated that the interfaces, reports, and/or graphics are merely exemplary, and that additional and alternative content is envisioned.

Figure 5B:
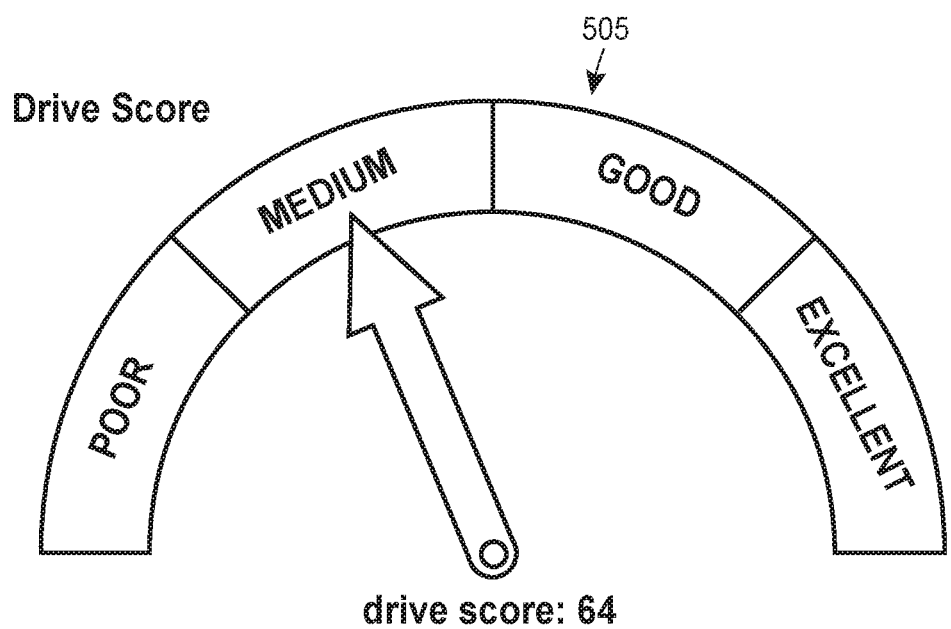

FIG. 5A illustrates an example driving report 500 that indicates certain data as measured during a trip and based on image data analysis. In particular, the report 500 indicates that during a particular trip, it was detected that the driver Yuntao used his/her phone two times, was distracted four times, and was drowsy once. FIG. 5B illustrates an example graphic 505 that indicates a "drive score" for a particular driver. As shown in FIG. 5B, the "drive score" is 64 which corresponds to a medium rating.

Figure 5C:
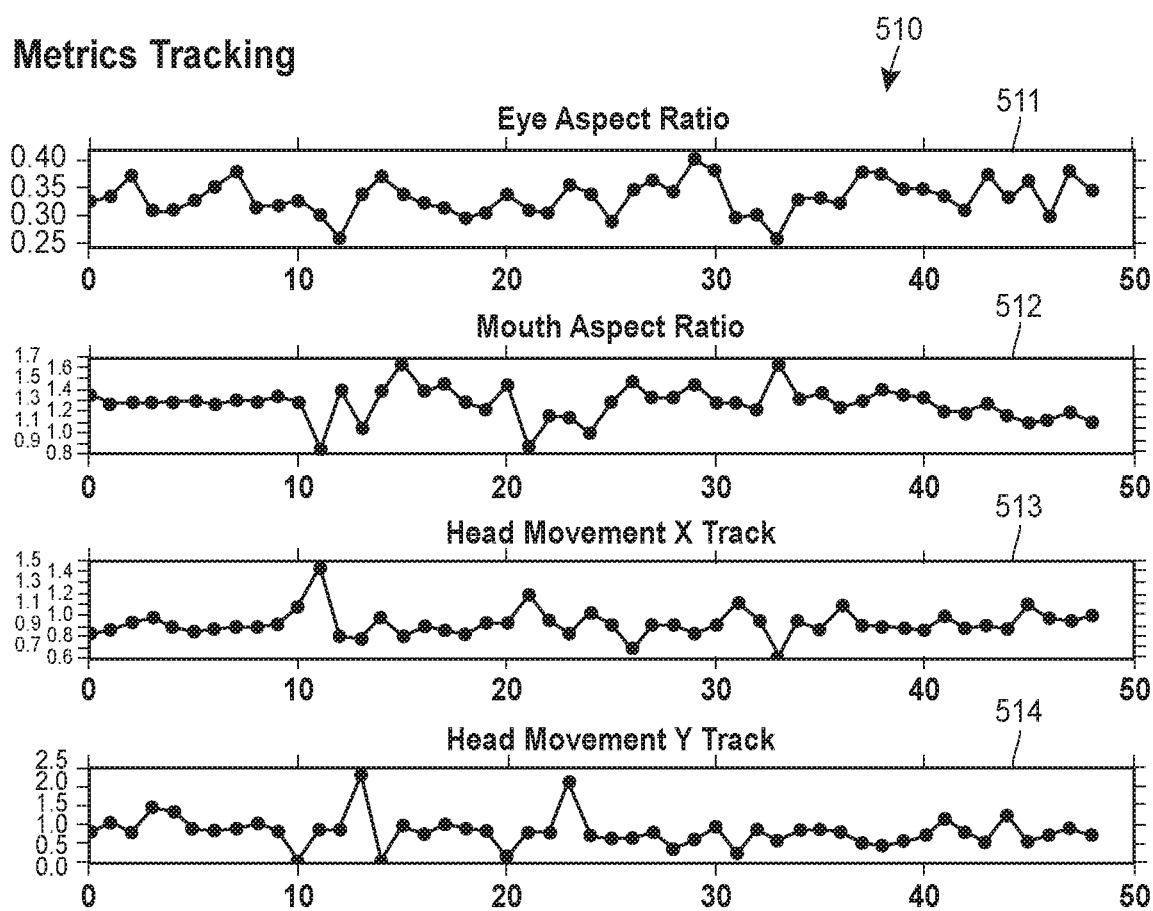

FIG. 5C illustrates an example report 510 of plots of various measured metrics across a time period. In particular, the report 510 includes a plot 511 for eye aspect ratio, a plot 512 for mouth aspect ratio, a plot 513 for horizontal head movement, and a plot 514 for vertical head movement. By reviewing the report 510, a user may be able to effectively and efficiently assess activity of the corresponding operator, and instances of when the operator may have created an unsafe driving condition(s).

Figure 5D:
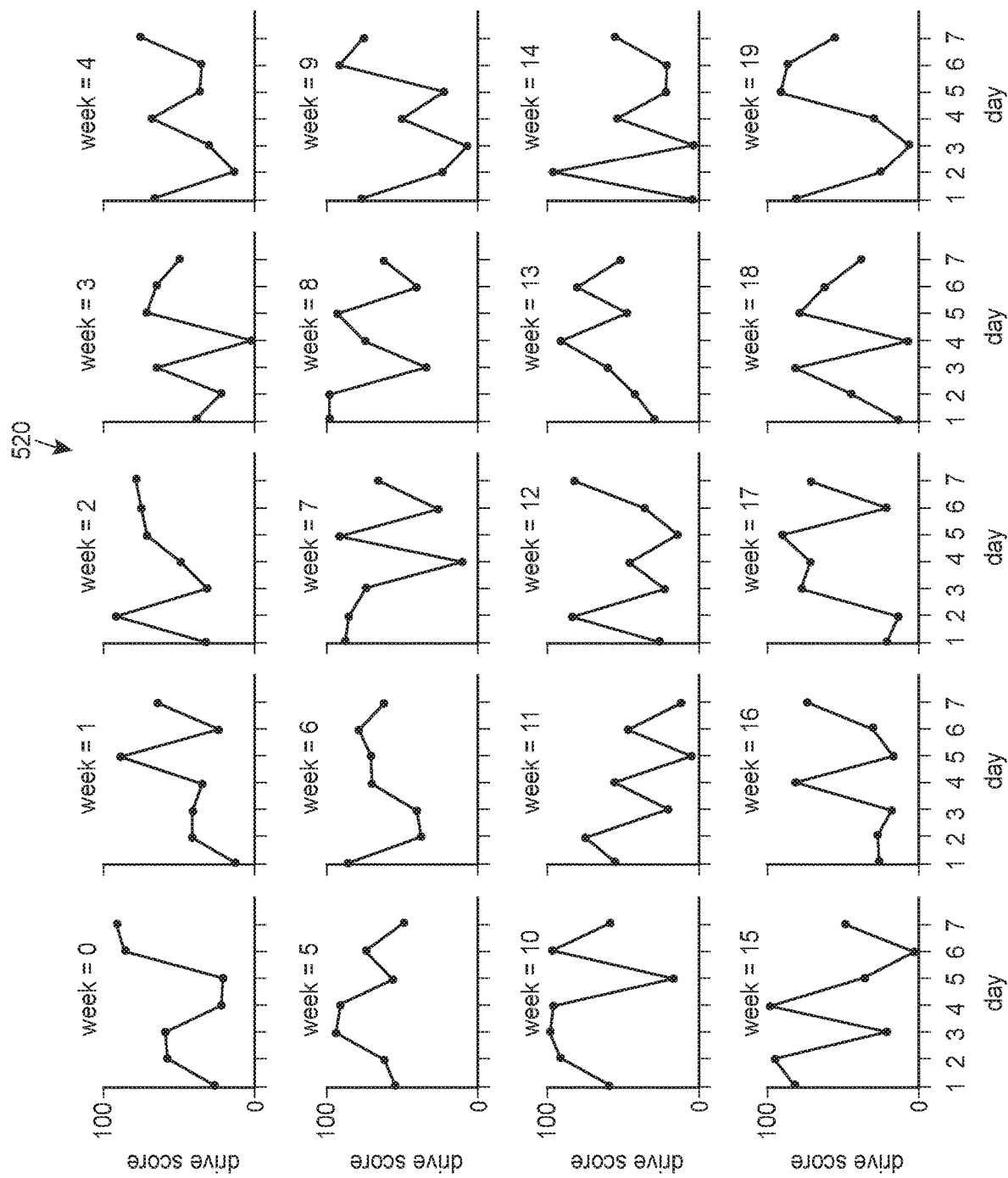

FIG. 5D illustrates an example report 520 of plots of calculated drive scores over time (as shown from week 0 through week 19). In particular, each week may include a calculated drive score for each day of that week. By reviewing the report 520, a user may be able to effectively and efficiently assess how the operator performed across various time periods.

Figure 6:
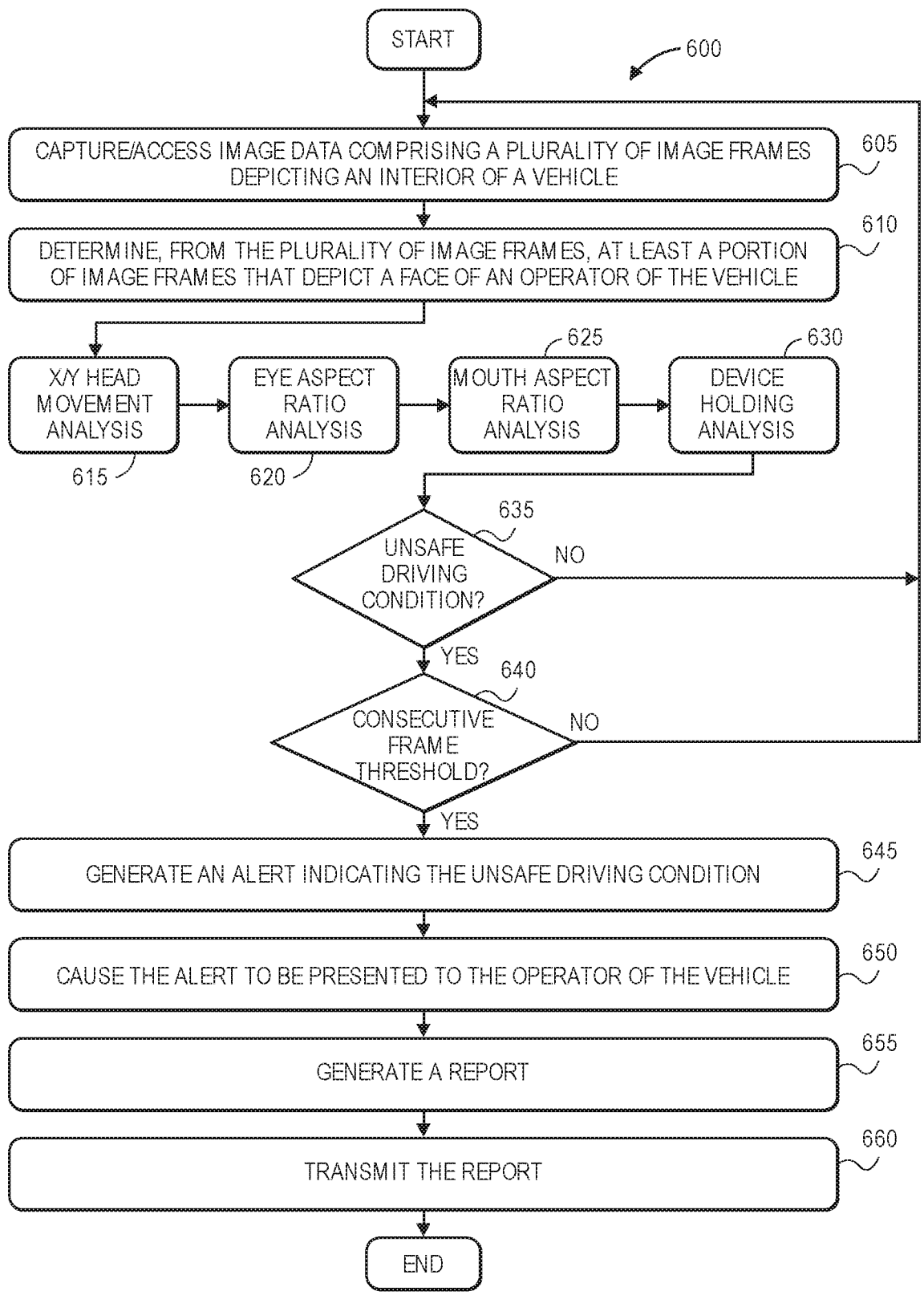
FIG. 6 depicts a block diagram of an example method of assessing driving safety within a vehicle, in accordance with some embodiments.

FIG. 6 depicts a block diagram of an example method 600 of assessing driving safety within a vehicle. The method 600 may be facilitated by at least one computing device that may be associated with the vehicle, where the computing device may be on board the autonomous vehicle. The computing device may be configured to communicate with one or more electronic devices or components, such as one or more image sensors.

The method 600 may begin when the computing device captures and/or accesses (block 605) image data, where the image data may include a plurality of image frames depicting an interior of the vehicle. According to embodiments, the computing device may access the image data from an external camera or image sensor that may continuously capture the image data, or may include a built-in camera that captures the image data.

The computing device may determine (block 610), from the plurality of image frames, at least a portion of the image frames that depict a face of an operator of the vehicle. After determining at least the portion of the image frames, the computing device may facilitate various image analyses on at least the portion of the image frames. In particular, the computing device may measure (block 615) horizontal and/or vertical head movement or position metrics of the operator as depicted in a first image frame. Additionally or alternatively, the computing device may measure (block 620) an eye aspect ratio of the operator as depicted in the first image frame. Additionally or alternatively, the computing device may measure (block 625) a mouth aspect ratio of the operator as depicted in the first image frame. Additionally or alternatively, the computing device may perform (block 630) a device holding analysis based on the first image frame. In particular, the computing device may identify a facial region of the face of the operator as depicted in the first image frame.

The computing device may determine (block 635) whether an unsafe driving condition is present, such as from one or more of the processing in blocks 615, 620, 625, and 630. In embodiments, the computing device may determine that the horizontal and/or vertical head movement or position as depicted in the first image frame falls outside of a threshold value range; determine that the eye aspect ratio as depicted in the first image frame is below an eye aspect ratio threshold value; determine that the mouth aspect ratio as depicted in the first image frame exceeds a mouth aspect ratio threshold value; and/or identify, proximate to the facial region as depicted in the first image frame, a hand of the operator holding an electronic device. If the computing device determines that an unsafe driving condition is not present ("NO"), processing may repeat, end, or proceed to other functionality. If the computing device determines that an unsafe driving condition is present ("YES"), processing may proceed to block 640.

At block 640, the computing device may determine if a consecutive frame threshold has been reached, where the consecutive frame threshold may represent an amount of consecutive image frames that depict a certain condition. In particular, the computing device may determine that the amount of consecutive image frames having the measured horizontal and/or vertical head movement or position that falls outside of the corresponding threshold value range exceeds the consecutive frame threshold; determine that the amount of consecutive image frames having the measured eye aspect ratio that is below the eye aspect ratio threshold value exceeds the consecutive frame threshold; determine that the amount of consecutive image frames having the measured mouth aspect ratio that exceeds the mouth aspect ratio threshold value exceeds the consecutive frame threshold; and/or determine that the amount of consecutive image frames depicting the hand of the operator holding the electronic device exceeds the consecutive frame threshold. If the computing device determines that that consecutive frame threshold is not exceeded ("NO"), processing may repeat, end, or proceed to other functionality. If the computing device determines that the consecutive frame threshold is exceeded ("YES"), processing may proceed to block 645.

At block 645, the computing device may generate an alert indicating the unsafe driving condition. According to embodiments, alert may be a visual alert, an audio alert, or the like, that indicates the unsafe driving condition. The computing device may cause (block 650) the alert to be presented to the operator of the vehicle. According to embodiments, the computing device may present, via a user interface, a visual alert to the operator, or may output an audio alert via an audio output component (i.e., a speaker).

The computing device may also generate (block 655) a report that may indicate at least data associated with the analysis of the at least the portion of image frames. In embodiments, the computing device may generate the report in response to detecting a conclusion of operation of the vehicle, or in response to other triggers. The computing device may transmit (block 660) the report, such as to an external computing device via a communication network.

Figure 7:
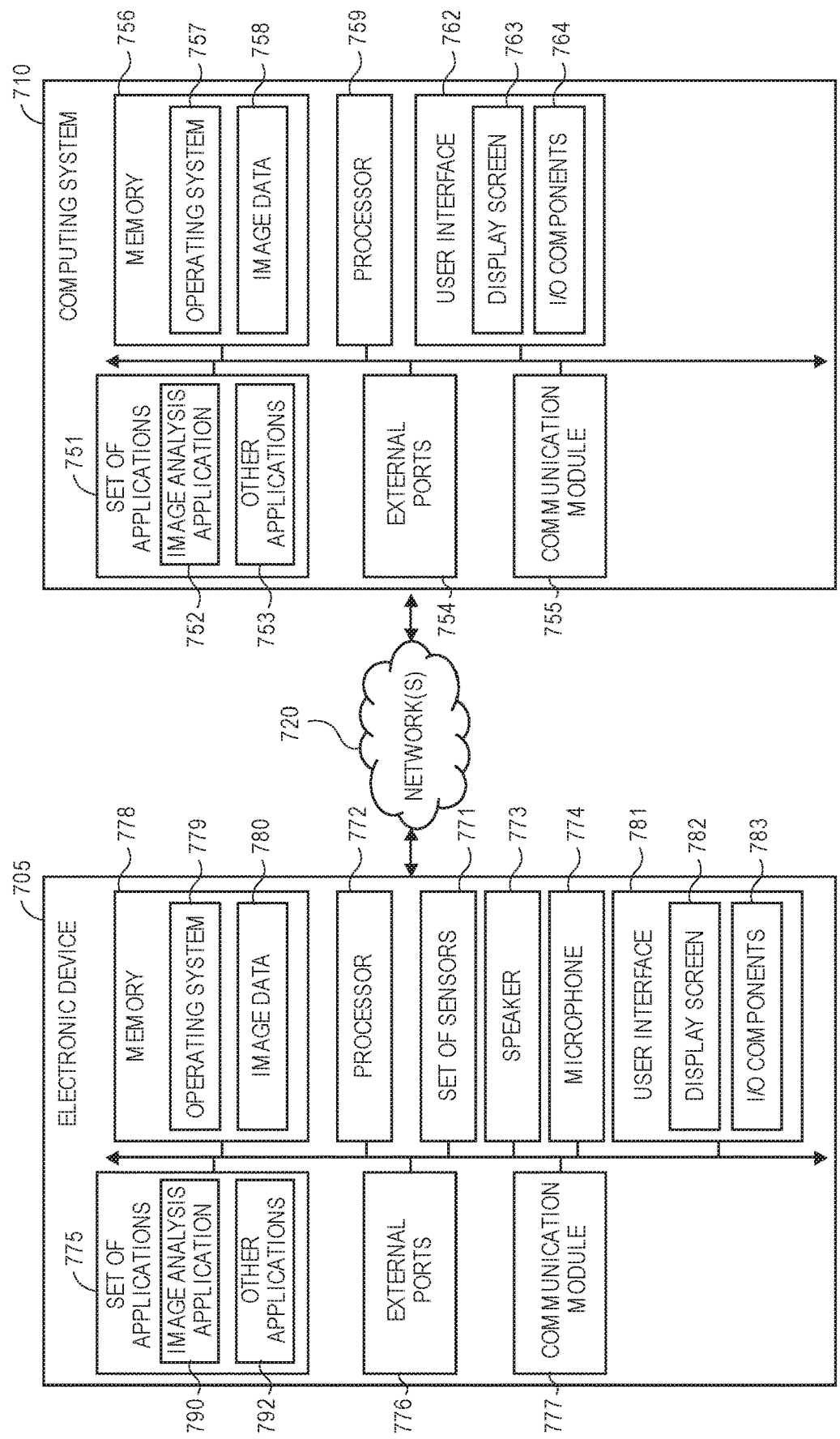
FIG. 7 is a hardware diagram of an example electronic device and an example computing system, in accordance with some embodiments.

FIG. 7 illustrates a hardware diagram of an example electronic device 705 (such as the infotainment device 120, the monitoring device 116, or the mobile computing device 119 as discussed with respect to FIG. 1) and an example computing system 710 (such as the computing device 108 as discussed with respect to FIG. 1), in which the functionalities as discussed herein may be implemented.

The electronic device 705 may include a processor 772 as well as a memory 778. The memory 778 may store an operating system 779 capable of facilitating the functionalities as discussed herein as well as a set of applications 775 (i.e., machine readable instructions). For example, one of the set of applications 775 may be an image analysis application 790 configured to facilitate various of the functionalities as discussed herein. It should be appreciated that one or more other applications 792 are envisioned, such as an autonomous vehicle operation application.

The processor 772 may interface with the memory 778 to execute the operating system 779 and the set of applications 775. According to some embodiments, the memory 778 may also include image data 780 including data accessed or collected from image sensor(s). The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 705 may further include a communication module 777 configured to communicate data via one or more networks 720. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. For example, the communication module 777 may interface with another device, component, or sensors via the network(s) 720 to retrieve sensor data.

The electronic device 705 may include a set of sensors 771 such as, for example, a location module (e.g., a GPS chip), an image sensor, an accelerometer, a clock, a gyroscope, a compass, a yaw rate sensor, a tilt sensor, telematics sensors, and/or other sensors. The electronic device 705 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs). According to some embodiments, the user may access the electronic device 705 via the user interface 781 to review information such as alerts or notifications, make selections, and/or perform other functions. Additionally, the electronic device 705 may include a speaker 773 configured to output audio data and a microphone 774 configured to detect audio.

In some embodiments, the electronic device 705 may perform the functionalities as discussed herein as part of a "cloud" network or may otherwise communicate with other hardware or software components within the cloud to send, retrieve, or otherwise analyze data.

As illustrated in FIG. 7, the electronic device 705 may communicate and interface with the computing system 710 via the network(s) 720. The computing system 710 may include a processor 759 as well as a memory 756. The memory 756 may store an operating system 757 capable of facilitating the functionalities as discussed herein as well as a set of applications 751 (i.e., machine readable instructions). For example, one of the set of applications 751 may be an image analysis application 752 configured to facilitate various of the functionalities discussed herein. It should be appreciated that one or more other applications 753 are envisioned.

The processor 759 may interface with the memory 756 to execute the operating system 757 and the set of applications 751. According to some embodiments, the memory 756 may also include image data 758, such as image data that is transmitted to the computing system 710 from the electronic device 705. The memory 756 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The computing system 710 may further include a communication module 755 configured to communicate data via the one or more networks 720. According to some embodiments, the communication module 755 may include one or more transceivers (e.g., WWAN, WLAN, and/or WPAN transceivers) functioning in accordance with IEEE standards, 3GPP standards, or other standards, and configured to receive and transmit data via one or more external ports 754. For example, the communication module 755 may receive, from the electronic device 705, a set(s) of image data.

The computing device 710 may further include a user interface 762 configured to present information to a user and/or receive inputs from the user. As shown in FIG. 7, the user interface 762 may include a display screen 763 and I/O components 764 (e.g., ports, capacitive or resistive touch sensitive input panels, keys, buttons, lights, LEDs). According to some embodiments, the user may access the computing device 710 via the user interface 762 to review information, make changes, input training data, and/or perform other functions.

In some embodiments, the computing device 710 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 772, 759 (e.g., working in connection with the respective operating systems 779, 757) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A system for assessing driving safety, comprising:
   at least one image sensor disposed on a vehicle and configured to capture image data, the image data comprising a plurality of image frames;
   a non-transitory memory storing computer-executable instructions; and
   a processor communicatively coupled to the at least one image sensor and the non-transitory memory, the processor being configured to execute the computer-executable instructions, wherein executing the computer-executable instructions causes the processor to:
   identify a portion of the plurality of image frames depicting a face of an operator of the vehicle,
   determine a first eye aspect ratio of the operator as depicted in the portion of the plurality of image frames,
   determine that the first eye aspect ratio is less than an eye aspect ratio threshold,
   determine a first number of consecutive image frames, of the portion of the plurality of image frames, in which the operator is depicted as having a second eye aspect ratio less than the eye aspect ratio threshold,
   determine that the first number of consecutive image frames exceeds an image frame threshold, and
   determine that an unsafe driving condition exists based at least in part on:
   the first eye aspect ratio being less than the eye aspect ratio threshold, and
   the first number of consecutive image frames exceeding the image frame threshold.

2. The system of claim 1, wherein determining that the unsafe driving condition exists includes causing the processor to:
   determine a first mouth aspect ratio of the operator as depicted in the portion of the plurality of image frames,
   determine that the first mouth aspect ratio exceeds a mouth aspect ratio threshold,
   determine a second number of consecutive image frames, of the portion of the plurality of image frames, in which the operator is depicted having a second mouth aspect radio exceeding the mouth aspect ratio threshold,
   determine that the second number of consecutive image frames exceeds the image frame threshold, and
   determine that the unsafe driving condition exists based at least in part on:
   the first mouth aspect ratio exceeding the mouth aspect ratio threshold, and
   the second number of consecutive image frames exceeding the image frame threshold.

3. The system of claim 2, wherein the processor is further configured to:
   identify, using a neural network, a facial region of the operator from a first image frame of the portion of the plurality of image frames,
   determine a reference mouth aspect ratio of the operator based at least in part on a reference number of image frames, and
   determine the mouth aspect ratio threshold based at least in part on the reference mouth aspect ratio.

4. The system of claim 1, wherein determining that the unsafe driving condition exists includes causing the processor to:
   measure a first head motion metric of the operator in at least one direction as depicted in the portion of the plurality of image frames,
   determine that the first head motion metric in the at least one direction falls outside of a head movement threshold,
   determine a third number of consecutive image frames, of the portion of the plurality of image frames, in which the operator is depicted having a second head motion metric in the at least one direction falling out of the head movement threshold,
   determine that the third number of consecutive image frames exceeds the image frame threshold, and
   determine that the unsafe driving condition exists based at least in part on:
   the first head motion metric in the at least one direction falling out of the head movement threshold, and
   the third number of consecutive image frames exceeding the image frame threshold.

5. The system of claim 4, wherein the head motion metric includes at least one of a horizontal head movement metric of the operator or a vertical head movement metric of the operator.

6. The system of claim 4, wherein the head movement threshold includes a head movement range in the at least one direction.

7. The system of claim 4, wherein the processor is further configured to:
   identify, using a neural network, a facial region of the operator from a first image frame of the portion of the plurality of image frames,
   determine a reference head movement threshold of the operator based at least in part on a reference number of image frames, and
   determine the head movement threshold based at least in part on the reference head movement threshold.

8. The system of claim 1, wherein determining that the unsafe driving condition exists includes causing the processor to:
   determine a fourth number of consecutive image frames, of the portion of the plurality of image frames, in which a hand of the operator is depicted as holding an electronic device, determine that the fourth number of consecutive image frames exceeds the image frame threshold, and determine that the unsafe driving condition exists based at least in part on the fourth number of consecutive image frames exceeding the image frame threshold.

9. The system of claim 8, wherein determining the fourth number of consecutive image frames includes causing the processor to:

identify a facial region of the operator from an image frame of the portion of the plurality of image frames, determine at least one of a color, a texture, or a shape of skin areas proximate the facial region of the operator, and determine, based on the at least one of the color, the texture, or the shape of skin areas proximate the facial region of the operator, that the hand of the operator is holding the electronic device.

10. The system of claim 9, wherein the processor is further configured to:

classify objects proximate to the facial region based at least in part on at least one of the color, the texture, or the shape of skin areas proximate the facial region of the operator, and determine the hand of the operator is holding the electronic device based at least in part on the classification of the objects proximate to the facial region.

11. The system of claim 1, wherein the processor is further configured to perform at least one of:

generating a visual alert indicating the unsafe driving condition, and causing the visual alert to be presented on a user interface of the system; or generating an audio alert indicating the unsafe driving condition, and causing the audio alert to be output by an audio output component of the system.

12. The system of claim 1, wherein the processor is further configured to:

identify using a neural network model, a facial region of the operator from a first image frame of the portion of the plurality of image frames.

13. The system of claim 12, wherein the processor is further configured to:

determine a reference eye aspect ratio of the operator based at least in part on a reference number of image frames, and determine the eye aspect ratio threshold based at least in part on the reference eye aspect ratio.

14. A computer-implemented method, comprising:

identifying, from a plurality of image frames captured by an image sensor disposed on a vehicle, a portion of the plurality of image frames that depict a face of an operator of the vehicle, determining a first eye aspect ratio of the operator as depicted in the portion of the plurality of image frames, determine that the first eye aspect ratio is less than an eye aspect ratio threshold, determining a first number of consecutive image frames, of the portion of the plurality of image frames, in which the operator is depicted as having a second eye aspect ratio less than the eye aspect ratio threshold, determining that the first number of consecutive image frames exceeds an image frame threshold, and determining that an unsafe driving condition exists based at least in part on:

the first eye aspect ratio being less than the eye aspect ratio threshold, and the first number of consecutive image frames exceeding the image frame threshold.

15. The method of claim 14, further comprising:

measure a first mouth aspect ratio of the operator as depicted in the portion of the plurality of image frames, determine that the first mouth aspect ratio exceeds a mouth aspect ratio threshold, determining a second number of consecutive image frames, of the portion of the plurality of image frames, in which the operator is depicted having a second mouth aspect radio exceeds the mouth aspect ratio threshold, determining that the second number of consecutive image frames exceeds the image frame threshold, and determining that the unsafe driving condition exists based at least in part on:

the first mouth aspect ratio exceeding the mouth aspect ratio threshold, and the second number of consecutive image frames exceeding the image frame threshold.

16. The method of claim 14, further comprising:

measure a first head motion metric of the operator in at least one direction as depicted in the portion of the plurality of image frames, determine that the first head motion metric falls outside of a head movement threshold, determining a third number of consecutive image frames, of the portion of the plurality of image frames, in which the operator is depicted having a second head motion metric falling outside of a head movement threshold, determining that the third number of consecutive image frames exceeds the image frame threshold, and determining that the unsafe driving condition exists based at least in part on:

the first head motion metric falling outside of the head movement threshold, and the third number of consecutive image frames exceeding the image frame threshold.

17. The method of claim 14, further comprising:

determining a fourth number of consecutive image frames, of the portion of the plurality of image frames, in which a hand of the operator is depicted as holding an electronic device, determining that the fourth number of consecutive image frames exceeds the image frame threshold, and determining that the unsafe driving condition exists based at least in part on the fourth number of consecutive image frames exceeding the image frame threshold.

18. The method of claim 14, further comprising:

identifying, using a neural network model, a facial region of the operator from a first image frame of the portion of the plurality of image frames;

measuring a reference eye aspect ratio of the operator based at least in part on a reference number of image frames, and determining the eye aspect ratio threshold based at least in part on the reference eye aspect ratio.

19. The method of claim 14, further comprising:

generating a visual alert indicating the unsafe driving condition, and causing the visual alert to be presented on a user interface of the system; or generating an audio alert indicating the unsafe driving condition, and causing the audio alert to be outputted on an audio output component of the system.

20. A non-transitory computer-readable medium, comprising:

a plurality of instructions which, when executed by one or more processors, cause the one or more processors to:

identify a portion of the plurality of image frames depicting a face of an operator of the vehicle, determine a first eye aspect ratio of the operator as depicted in the portion of the plurality of image frames, determine that the first eye aspect ratio is less than an eye aspect ratio threshold, determine a first number of consecutive image frames, of the portion of the plurality of image frames, in which the operator is depicted as having a second eye aspect ratio less than the eye aspect ratio threshold, determine that the first number of consecutive image frames exceeds an image frame threshold, and determine that an unsafe driving condition exists based at least in part on:
the first eye aspect ratio being less than the eye aspect ratio threshold, and the first number of consecutive image frames exceeding the image frame threshold.

\* \* \* \* \*